(12) United States Patent
Lang

(10) Patent No.: US 6,663,455 B1
(45) Date of Patent: Dec. 16, 2003

(54) BALLOONS AND WRAPPING MATERIALS

(76) Inventor: Phillip E. Lang, Winnington Lodge, 40 Lyttelton Road, London (GB), N2 0TW ( * ) Notice: Subject to any disclaimer, the term of this patent is extended or adjusted under 35 U.S.C. 154(b) by 0 days.

(21) Appl. No.: 09/762,933

(22) PCT Filed: Aug. 24, 1999

(86) PCT No.: PCT/GB99/02787

§ 371 (c)(1),
(2), (4) Date: Mar. 6, 2001

(87) PCT Pub. No.: WO00/11067

PCT Pub. Date: Mar. 2, 2000

(30) Foreign Application Priority Data

Aug. 25, 1998 (GB) .............................. 9818530
Mar. 15, 1999 (GB) .............................. 9906002

(51) Int. Cl.⁷ .............................. B65D 65/00
(52) U.S. Cl. .................. 446/71; 446/220; 206/459.5
(58) Field of Search ................. 446/220, 221, 446/222, 224, 226, 71, 73, 76; 206/457, 459.1, 459.5

(56) References Cited

U.S. PATENT DOCUMENTS

| | | | |
|---|---|---|---|
| 4,171,064 A | 10/1979 | Friess et al. | |
| 4,269,891 A | 5/1981 | Minagawa | |
| 4,305,501 A * | 12/1981 | Collette | 206/457 |
| 5,031,299 A * | 7/1991 | Lovik | 29/454 |
| 5,083,961 A * | 1/1992 | Ishiwa | 446/75 |
| 5,447,010 A * | 9/1995 | Voigt | 53/427 |
| 5,577,947 A | 11/1996 | Malloy et al. | |
| 5,663,023 A | 9/1997 | Malhotra | |
| 5,665,505 A | 9/1997 | Malhotra | |
| 5,710,588 A | 1/1998 | Malhotra | |
| 5,776,604 A | 7/1998 | Lu et al. | |
| 5,795,695 A | 8/1998 | Malhotra et al. | |

FOREIGN PATENT DOCUMENTS

| | | |
|---|---|---|
| CA | 2029218 | 5/1991 |
| EP | 0 850 777 | 7/1998 |
| GB | 2 318 546 A | 4/1998 |

OTHER PUBLICATIONS

Database WPI Week 9351 Derwent Publications Ltd., London, GB; AN 1993–410967 & JP 05 310976 (UNITIKA Ltd), Nov. 1993.
"The Photolon™ System" brochure, Crosspoint Technologies Inc., 1989.

* cited by examiner

*Primary Examiner*—Jacob K. Ackum
(74) *Attorney, Agent, or Firm*—Nixon & Vanderhye

(57) ABSTRACT

Foils is adapted to be marked readily by having a water-soluble, water-based or other surface coating (22) applied thereto. The adapted surface (22) permits ink to mark the foil. Such foil may be used for manufacturing balloons (10) or wrapping materials. A method of manufacturing such a foil comprises the step of spraying onto the surface or otherwise adapting the surface (22) of the foil with a readily markable substance, such as a water-soluble coating, to permit printing of chosen designs (24) onto the foil. A method of imprinting a foil with a design (24) comprises the step of feeding a package (36) containing foil through a printer, the printer being arranged for printing the design (24) onto an adapted surface of the foil exposed by the package (36).

17 Claims, 3 Drawing Sheets

BALLOONS AND WRAPPING MATERIALS

The present invention relates to foil balloons and wrapping materials, a printing kit, a method of manufacturing a balloon, a method of pre-treating a surface prior to printing and a method of imprinting a design onto foil balloons or foil or other wrapping materials.

Some wrapping materials in current use are in the form of plastics foils, such as polyesters, polyamides and polycarbonates, or coated paper. Balloons may also be fabricated from plastics foils. The materials may have a metallic appearance, such as those made from aluminised nylon foil extrusion-coated with polyethylene. Balloons manufactured by Anagram International Inc., of Minneapolis, Minn. 55344-7307, U.S.A. use this type of material. These balloons are marketed in many shapes and sizes. Alternatively, the material may simply be an opaque or transparent glossy plastics material and may be non-metallised. These plastic materials are referred to herein as "foil".

Foil suffers from the problem of not being able to receive printed images when using conventional ink-jet or bubble-et printers. Images printed or drawn onto balloons or wrapping paper made from foil have a tendency of being either non-permanent or non-effective due to the ink not actually marking the material.

Balloons and wrapping paper made from foil are known which have had images permanently imprinted thereon at the time of manufacture. For example, foil balloons are manufactured in many different designs and are often supplied with greetings, such as "Happy Birthday", with an image form, e.g. Walt Disney, or with corporate logos printed thereon. However, the design is applied at the factory, either at the stage of making the foil or at a later stage by a printer, using silk-screen, flexographic or other printing techniques, and the process is not suitable for making one-off balloon designs due to the tooling-up cost for each design imprinted upon the foil and the need to stock a quantity of balloons bearing each design. It would be desirable to address this problem to allow commercial production of one-off or low-volume runs of specific personalised messages or images, including photographs, onto foil balloons or wrapping materials.

It would not be feasible to use a photocopier to print images on foil balloons or wrapping materials, since the foil could melt, or at least distort, when subjected to the high temperatures encountered in a photocopier.

Equally, foil will not readily accept writing from non-permanent writing implements. Attempts using an ink-jet printer have not worked, because the image thereby produced does not permanently dry onto the surface of the foil, and the image smudges instantly upon being touched.

It would therefore be desirable to provide a foil which can readily be marked by both permanent and non-permanent writing implements. It would further be desirable to provide a foil balloon and a foil wrapping material that can readily be marked by both permanent and non-permanent writing implements.

A disadvantage displayed by aluminised foil balloons is that the aluminium contained in the material renders the balloons visible to microwave radiation used in radar and as such the United Kingdom's Civil Aviation Authority prohibits their use for balloon release purposes or as high-level static display devices. It would therefore be desirable to provide a foil balloon of substantially clear or coloured construction of any desired size, that contains a printable area and which has the benefit of being transparent to microwave radiation. Such a balloon could allow for large-scale foil balloon releases and would be suitable for large static display advertisements.

A first aspect of the present invention provides a foil, at least part of the surface of which is adapted to be marked readily such that designs and the like may be printed onto the adapted surface of the foil. A single-sided coated foil can be used to create a balloon that has a receptive print area on both sides of the balloon.

The surfaces of both faces of the foil may be so adapted to be marked such that a respective design may be imprinted on each face of the foil.

Preferably, the adapted surface comprises a water-soluble or water-based coating. The coating may be an absorbent coating for absorbing ink. Such coatings are referred to in the trade as inkjet lacquers. By way of example, inkjet lacquers are already commonly applied to ink-jet printer transparencies, such as those produced by 3M, Xerox and Esselte, producing photographic-type imaging. Such coatings can be applied commercially by the following companies: Sensitisers (Research) Ltd., Sensitisers Industrial Coating Research, 1 Blackdown Road, Deepcut, CAMBERLEY, Surrey, GU16 6SH, UK; Tekra Advanced Technologies Group, 16700 West Lincoln Avenue, New Berln, Wis. 53151, USA; and Microseal Industries Inc., 610 East Street, Paterson, N.J., 07509-3054, USA. These inkjet lacquers are based on aqueous polyvinyl alcohols and the acrylic family of chemicals, with varying compositions to provide the required drying times, absorbency, weight and/ or any other desirable characteristic.

The coating is additionally preferably substantially transparent so as to retain the colour of the underlying surface of the foil. Alternatively, the coating may impart a colour to the underlying surface. The coating may additionally impart a scent to the surface, or a scent may be added afterwards, as the coating is preferably absorbent to perfume, etc. and will retain it while packaged in an air tight manner for long periods prior to opening.

Preferred materials for the coating are those which are particularly insensitive to finger contact.

The foil may be a sheet of wrapping paper, or it may be a part of a balloon. In the latter case, the thickness and the density of the coating are preferably so low as not substantially to add weight to the balloon, such that it can still rise effectively when inflated with a suitable gas of low density.

Additionally, when the foil forms a balloon, the surface which is adapted to be marked may be the inner surface of the balloon, such that a design applied to the balloon is thereby better protected. In this case, the design is preferably printed in its mirror image.

The adapted surface, when forming at least part of a balloon, allows ink, whether liquid, dry or toner-based, to be applied to the surface of the balloon either in an inflated state or prior to inflation of the balloon. For example, ink may be applied to the surface of the balloon by a hand-held inkjet, such as those used in egg farms, or by a standard desk-top inkjet printer.

A layer of substantially opaque ink may be applied to the foil in addition to the ink for the design, thereby enabling the design to be applied to a transparent foil. This additional layer may conveniently be applied by means of an inkjet printer, and may be applied by the same printer as used for the application of the design.

When applying a design onto the inner surface of a balloon, the layer of substantially opaque ink is desirably applied to the foil after the application of the ink for the design, so that the opaque ink serves to enhance the visibility of the design.

The substantially opaque ink is preferably white, but alternatively may be coloured, so as to impart a background colour to the design.

Balloons, prior to inflation, or wrapping materials, according to the present invention, may be formed in, or folded into, a substantially rectangular sheet-like shape, thereby being adapted to feed through a conventional inkjet printer. To assist in this, the balloon or sheet may be wrapped around a relatively rigid former, or substrate, for example a rectangular sheet of card or any fine film. Such a substrate may advantageously be provided with a layer of light adhesive so as to retain the balloon or sheet in position during printing but which will enable the balloon or sheet to be released readily from the substrate. In this case, it will be appreciated, that, although only part of one side of the balloon appears on one side of the rectangular sheet, it would still be possible to print an image covering the entire area of one side of the balloon, simply by feeding the balloon and sheet through the printer twice, so that a respective part of the image can be printed for each pass through the printer. Alternatively, or in addition, each folded balloon or folded sheet of wrapping material may be tensioned on an underlying substrate, by a light adhesive or other means. In either case, the substrate may advantageously be reusable. The balloon or sheet may also be folded prior to attachment to the adhesive substrate. The edges of the balloon may be secured by tape or by spots of adhesive, e.g. of the type which is used to secure credit cards to paper.

Alternative adaptations may be used to enable the item to feed through the printer, for example the balloon may be rectangular in shape, or it may itself have removable flanges or corners provided to form an over-all rectangular shape for feeding through a printer. In this case, the removable flanges or corners can remain on the substrate after removal of the balloon therefrom. If a substrate with a light adhesive is employed, the removable flanges serve to protect the printer from being exposed to this adhesive. With such an arrangement, the balloons can be manufactured as a continuous belt, in the form of a bandoleer, with perforations between each adjacent pair of balloons, and the balloons would either be fan-folded or provided on a reel. Such a reel could conveniently have a width of 812.8 mm (32 inches), which can then conveniently be fed through a commercially-available printer having a standard printing width of 914.4 mm (36 inches). Wrapping materials may also be appropriately adapted, and an unused area between successive sheets can then serve the same function as the removable flange in the case of balloons. Such fan-folded or reel arrangements are particularly suitable for industrial or major retail operations.

In the case of balloons, whether these are supplied in a fan-fold arrangement, as a reel or supplied individually, the use in an automatic vending machine is envisaged, such as those currently used for the production of personalised greetings cards. The balloons may be fed as paper is conventionally fed in stacks and individually picked, as with a standard desk-top ink-jet printer.

Alternatively, the balloon or wrapping material may be supplied in a packet, the packet, together with the balloon or wrapping material, forming a package, at least part of the external surface of the balloon or wrapping material forming a printable surface of the package. Where the balloon or wrapping material is larger than the size of the packet, a folding operation takes place, which may be assisted by a substrate, of the above-described type, around which the balloons or wrapping paper are wrapped. Once the folding operation is complete, the substrate may be removed before insertion into the packet. The packet is either disposable or reusable.

The package is preferably adapted to feed through an inkjet printer or a laser printer. By making the packages in a standard size, e.g. A4 (210 mm by 296 mm), the accurate positioning of the packages in relation to the printer is assured. This would allow a design of up to A4 size to be printed on either the wrapping paper or the balloon.

When the balloons or wrapping paper are supplied to the printer, it is preferred that the leading edge is a straight line, for ease of insertion into the printer and to activate the printer operation via its paper detectors.

In the case where both sides of a balloon or wrapping material have been coated, and where it is desired to print images on each side, the use of such a package is especially preferred. In this case, the packet is so structured as to allow the area of each side of the balloon or wrapping material to be exposed to the printer, and the balloon or wrapping material is passed through the printer twice to enable both surfaces to be printed.

The present invention may also be supplied as a kit comprising a least one balloon or a quantity of wrapping material, a printer and a computerised drawing package, e.g. for supplying to retailers, such as florists or market stalls.

The present invention extends to an automatic vending machine incorporating such a kit for printing a design on a balloon in accordance with data inputted by a customer, e.g. using a keyboard.

Imprinting a design or image onto a balloon or wrapping material according to the present invention comprises the step of applying ink onto the adapted surface of the balloon or wrapping material. Preferably the ink is quick drying. The ink can conveniently be applied by means of a standard desk-top colour inkjet/bubble-jet printer or a colour laser printer, using standard off-the-shelf colour ink cartridges. Thus the image to be printed onto the balloons or wrapping material can be captured by a number of means, such as e-mail, scanner, digital camera, video camera, or can even be software-generated, and the arrangement is particularly suited for use at home with a standard domestic personal computer system with a proprietary graphics software package for the production of individual personalised balloons and/or wrapping materials. Such images can also be transmitted by electronic mail. By way of example, in the case of flower wrap, the images could be transmitted to Interflora, where the flower wrap can be printed, or in the case of balloons in large quantities, the images could be transmitted to balloon printers.

It is possible to arrange for such balloons to be coated on both sides such that an image can be printed on both sides. Again, the thickness and the density of the coating are such as to enable the balloon to rise effectively when inflated with a suitable gas of low density.

Once the design is printed onto the surface of the foil, a further coating of a waterproof agent may advantageously be applied to protect the printed image, or, alternatively, the formulation of the initial coating can be modified to achieve the same effect without post-printing treatment.

A particularly desirable application of the present invention involves the use of luminescent, e.g. fluorescent or phosphorescent, printing inks for printing images on balloons, for use with ultraviolet lighting. Such an arrangement would be highly desirable when used in theatres, e.g. for creating a moving luminous image.

A balloon or sheet of wrapping material in accordance with the present invention may be manufactured by spraying or otherwise applying a coating onto at least part of the external surface of the foil. Alternatively, the foil surface may be adapted chemically or otherwise treated to allow marking or to enhance ink adhesion.

An alternative method of providing a treated surface could entail the use of a transfer operation wherein a water-based PVA or acrylic coating is applied to a release substrate and a suitable pressure-sensitive adhesive overlaid. This coating could be transferred to the foil either during manufacture or at the point of sale. In this case, it would be possible to apply a design to the coating itself, using a conventional photocopier, before transfer to the foil, since the heat of the photocopier would not then affect the foil balloon or wrapping material.

Balloons in accordance with the present invention may also be adapted to house a light source. A power source for the light source may be provided inside or outside the balloon. In the latter case, the conductor would pass through the balloon seal or though a separate access port. The material of such balloons is preferably translucent or transparent for illuminating an image provided thereon.

The invention extends to blank transfer paper which has been coated so as to be suitable for receiving an image from an ink-jet or bubble-jet printer. Such transfer paper, with an image printed thereon, would then be suitable for attachment to a balloon or a sheet of wrapping paper. As mentioned above, the images can be printed onto such transfer paper using a conventional photocopier.

In accordance with a further aspect of the present invention, there is provided an inflatable object made from a foil as described above which comprises a plurality of foil portions at least one of which has had a design applied thereto, and wherein the foil portions have been joined together to form the object after application of the at least one design.

The invention extends to a method of preparing an inflatable object comprising the steps of applying a design to a foil as described above and joining the foil to at least a second such foil thereby to create an inflatable object in the form of at least two portions. Such an arrangement is particularly convenient when applied to very large inflatables, which have conventionally been hand-painted or machine-printed. New computer-aided design technology will allow various strips of a balloon to be printed in a manner such that, whatever portion of the foil is covered, the sections may be cut and joined to form any desired shape, e.g. a banana or a dirigible. Since commercial printers typically have a maximum printing width of about 183 cm (72 inches), a design having a width in excess of this can therefore be created in this way using such printers.

However, even printers having a printing width of about 183 cm (72 inches) are relatively expensive. Thus, when applied to wrapping materials, the preferred maximum printing width is 61 cm (24 inches), since suitable-printers are readily available at reasonable cost. An example is the EnCad Chroma 24 model, manufactured by EnCad Inc., of San Diego, Calif., USA. In this case, wrapping sheets having a width of 122 cm (48 inches) can still be produced by folding before feeding to the printer.

The manner of folding is determined by the desired position of the design within the over-all width of the wrapping paper. Typically, there may be a single central fold, with the design appearing on one side, or there may be two folds positioned symmetrically about the centre line, such that the design appears centrally, or there may be two folds positioned asymmetrically, so that the design appears within two side margins but not centred on the wrapping foil. In all three cases, the wrapping material can be uniformly reeled. Additionally, the wrapping material can be perforated to allow a vendor to create sheets of different widths as desired.

For example, flower wrapping material is typically 81 cm (32 inches) wide. In this case, the wrapping material has a line of perforations which separate the 122 cm (48 inch) width into two strips, of 81 cm (32 inches) and 41 cm (16 inches) respectively. The material is then fed into a standard printer having a printing width of 61 cm (24 inches). Once printed, the vendor merely has to tear along the perforations to obtain wrapping material of the desired width. It will be appreciated that such wrapping material can be folded such that a width of anywhere between 15 cm (6 inches) and 61 cm (24 inches) can be coated, with the remaining portion being left uncoated. Additionally, perforations can be provided anywhere within the total width to provide any required width of printed foil.

The present invention will now be described, by way of example, with reference to the accompanying drawings, in which.

FIGS. 4(*a*), 4(*b*) and 4(*c*) illustrate different ways of folding a sheet of wrapping foil in accordance with an embodiment of the present invention.

Figure 1:
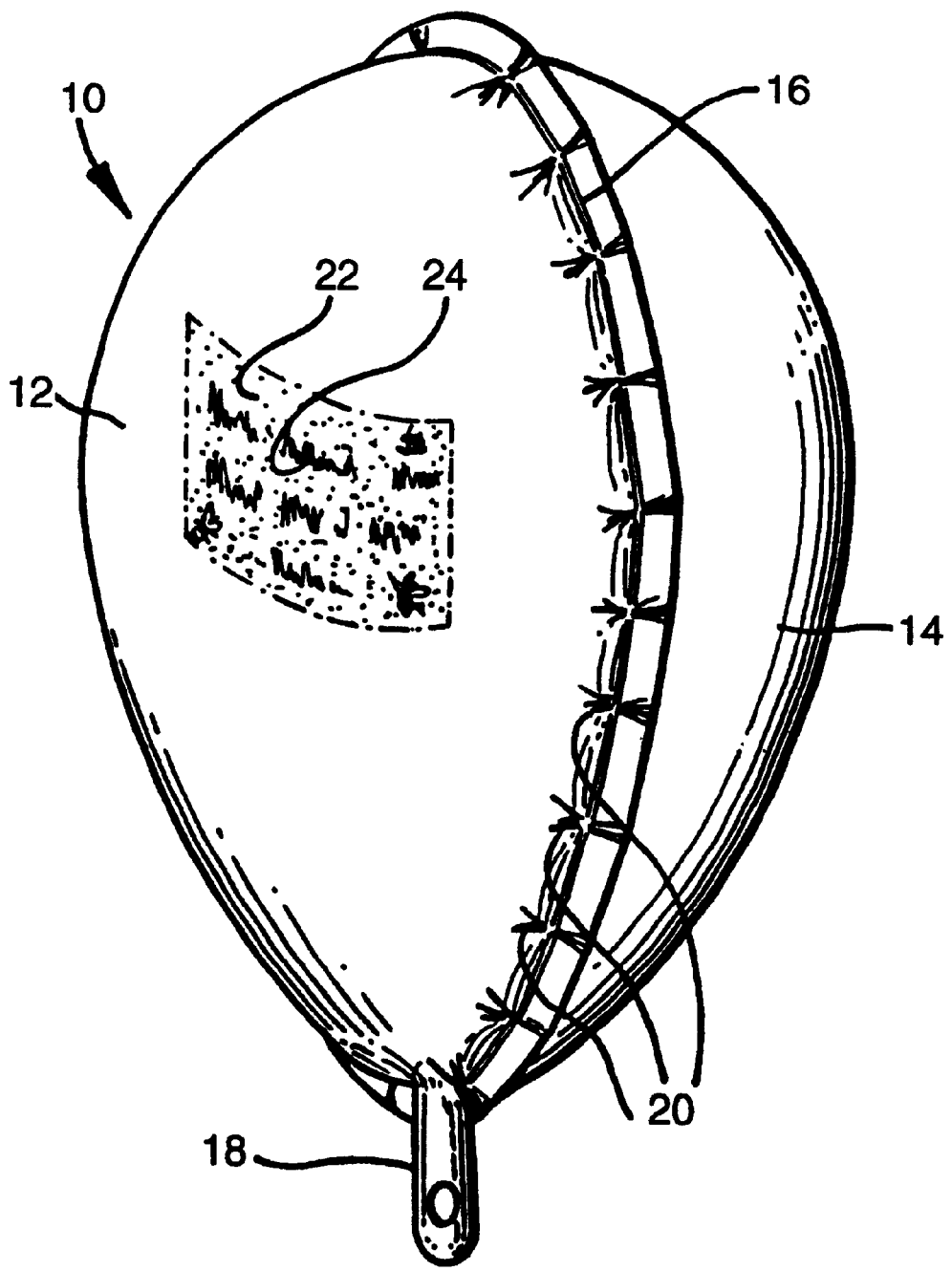
FIG. 1 is a perspective view of an inflated balloon in accordance with a preferred embodiment of the present invention.

Referring to FIG. 1, there is shown a balloon 10, made from two substantially circular sheets of foil material 12,14 having a welded joint 16 around their peripheries. An inflation point 18 is provided thereon for inflation of the balloon 10. The balloon 10 of FIG. 1 is shown inflated, the inflation causing creases 20 about the edge portion of the balloon 10. The balloon 10 may, however, be made in alternative shapes, such as heart shapes.

All or a part of the external surface of the balloon 10 has a coating 22. The coating 22 is preferably a water-soluble coating. However, the external surface may be otherwise treated to enhance markability or ink adhesion thereto. The external surface may be altered prior to, during or after the manufacture of the balloon.

The coating 22 has a design 24 printed thereon. This design 24 may have been imprinted either prior to or after inflation of the balloon by a printer, by hand, or any other suitable printing means.

Figure 2:
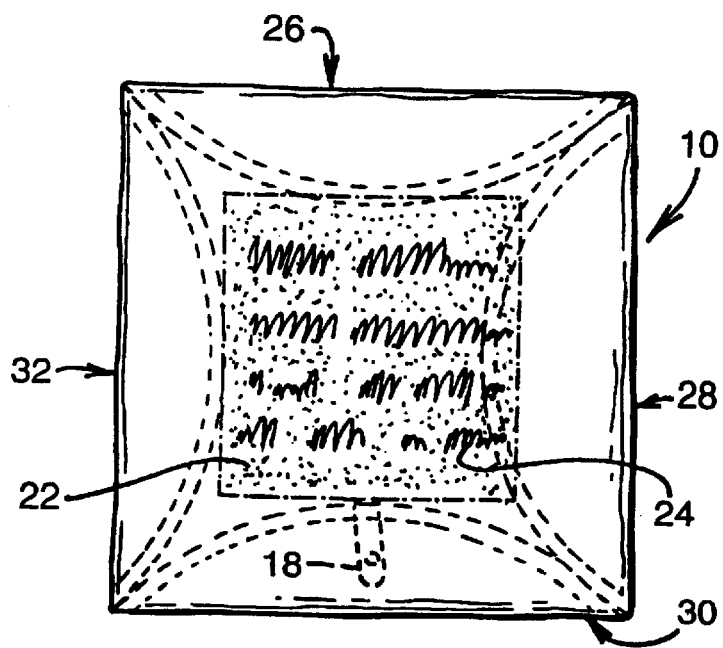
FIG. 2 shows a folded, non-inflated balloon of the present invention after having been fed through a printer.

FIG. 2 shows an uninflated balloon 10 in accordance with a preferred embodiment of the present invention, which has been folded into a rectangular shape. Although the balloon 10 is shown as being substantially circular, any shape may be used. In particular, for a rectangular balloon, the edges 26, 28, 30, 32 could be the edges of the actual balloon.

The purpose of folding the balloon along the edges 26, 28, 30, 32 is to allow the balloon 10 to feed through a printer (not shown). However, it may be possible to feed the balloon 10 through the printer without folding over any edges 26,28,30,32 or just those edges required to be folded, such as a leading edge, for example.

The folded balloon 10 has its external surface adapted by applying a water-soluble, water-based or solvent-based coating 22 thereto. This adapted surface 22 is not covered by the folded edges 26,28,30,32. In this manner, feeding the balloon 10 through a printer enables a design 24 to be printed onto the external surface of the balloon 10 on either side.

Figure 3:
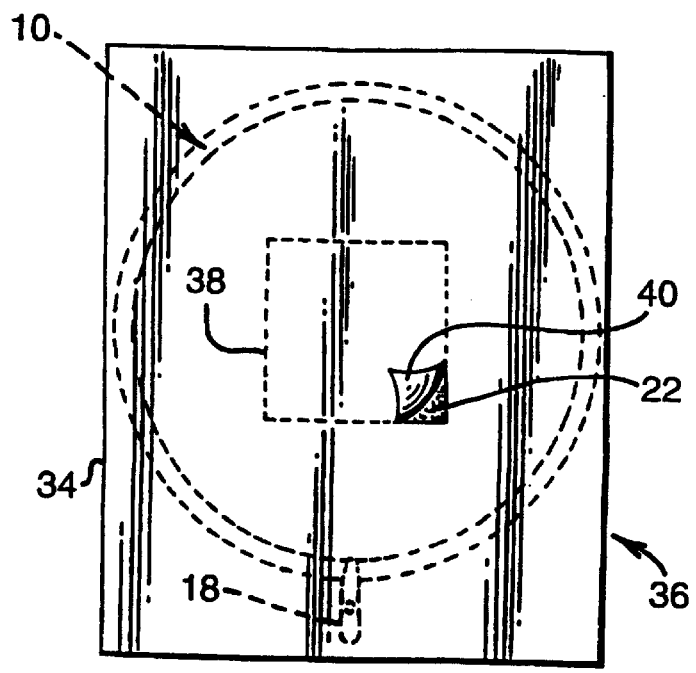
FIG. 3 shows a packet enclosing a balloon of the present invention.

A further development of the present invention is illustrated in FIG. 3. This shows a balloon 10 of the present invention housed within a packet 34 to form a package 36 comprising the packet 34 and the balloon 10. The packet 34 is formed with a tear-off portion 40, shown as being rectangular, but any shape could be used, arranged about the adapted surface 22 of the balloon 10. An aperture 38 may be formed by removing the tear-off strip 40 provided on the package to allow the balloon 10 to be supplied in a sealed packet 34. However, the tear-off strip 40 is purely optional, and the package may be provided with the aperture 38 already formed therein.

The package is dimensioned for feeding through a printer, such as a desktop inkjet printer. Preferably the package is of A4-size or other standard printer sizes. If required, the balloon 10 may be folded within the packet 34.

Balloons 10 of the present invention may be conventional foil balloons, and the adaptation of the surface 22 is an additional manufacturing step. This step may be performed either during the manufacturing stage of the balloon 10 by incorporating, for example, a spraying or coating step to apply the coating to the balloon 10, or the adapted surface 22 may be created at the point of sale of the balloon 10. At the point of sale, a spray can, or some other applying medium, of coating solution could be provided. For example, at a market stall, a supply of uninflated balloons 10 in a variety of colours could be provided with a supply of coating solution. The coating solution could be applied to the balloons 10 and allowed to dry. The adapted surface 22 thereby created could then be imprinted with the desired design 24, and the balloon 10 then sold.

Alternatively, packaged balloons 36 could be supplied, and the market stall could have a computer and printer set-up. The desired design 24 required for a selected balloon 10 could be chosen by the customer from a range of pre-written or user-customisable designs provided by a computerised drawing software package, and then the chosen design 24 could be printed onto the selected balloon 10 by the printer.

A major advantage of the present invention is that a store need only keep one supply of blank balloons 10 and a printing means. A customer requiring a particular design 24 would not need to place an order for, say, a run of 50 balloons. Further, the store need not maintain a large stock of each of the more common designs, since each balloon 10 in the store could be provided with any desired design.

Further, the coating may be scented such that the balloons 10 have a pleasant smell, e.g. for sale in florists.

Figure 4A:
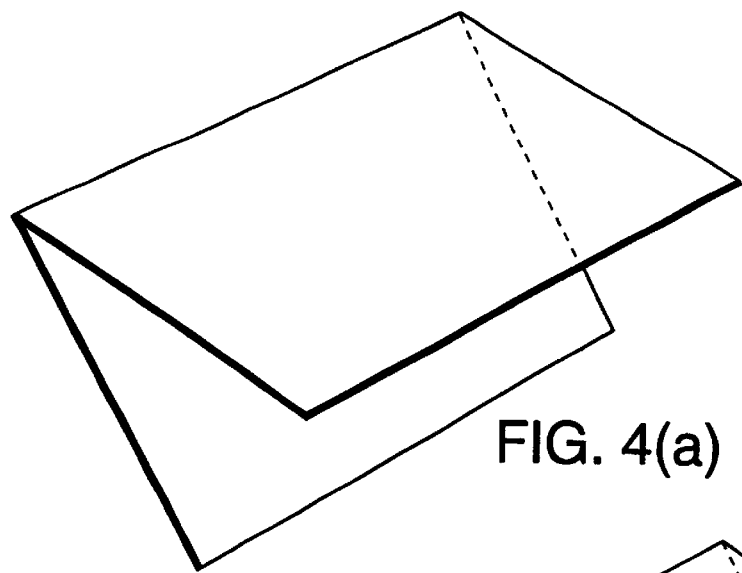
Figure 4B:
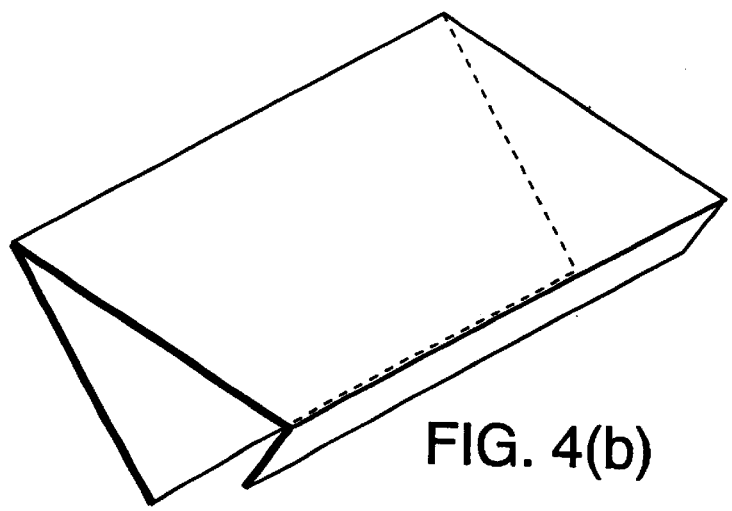
Figure 4C:
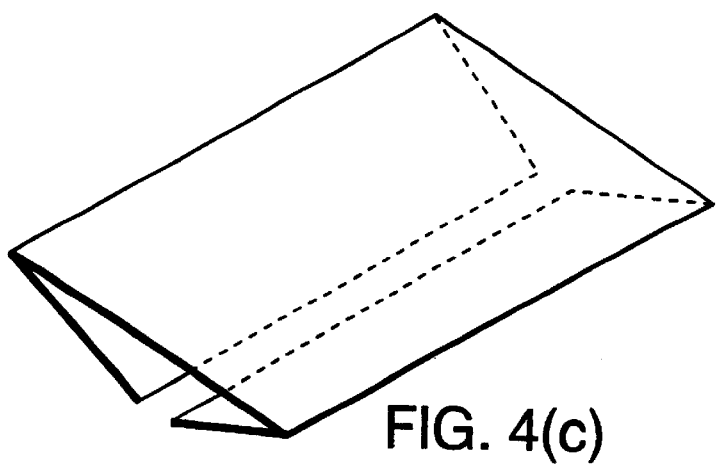

FIGS. 4(a), 4(b) and 4(c) illustrate ways in which a sheet of wrapping foil may be folded such that a design can be printed on part of the surface. These arrangements are particularly useful when the wrapping foil has a width which is too large for feeding to printers. FIG. 4(a) illustrates a wrapping foil folded with a single central fold; FIG. 4(b) illustrates a wrapping foil folded with two folds positioned asymmetrically about a centre line; and FIG. 4(c) illustrates a wrapping foil folded with two folds positioned symmetrically about a centre line.

Where the term "maximum printing width" has been used above, it is to be understood as referring to the maximum width of paper accepted by the printer in question. In practice, there will be an unprinted margin on each side of the printed region of typically about 5 mm within the figures quoted for the maximum printed width.

The present invention has been described above purely by way of example. It should be noted that modifications in detail may be made within the scope of the invention.

What is claimed is:

1. The combination of a balloon comprising a foil formed of one a metallic or glossy plastics material, at least part of a surface of said material being provided with an ink retentive markable coating such that a design may be imprinted thereon and a relatively rigid planar member to which the balloon is attached, the planar member acting as a supporting substrate, enabling the balloon to be fed, prior to inflation, through an inkjet printer for printing said design on said markable coating.

2. A combination as claimed in claim 1, wherein the balloon is folded around the planar member and the coating surface lies generally coplanar with the planar member prior to inflation.

3. A combination as claimed in claim 1, wherein the balloon is tensioned on the planar member.

4. A combination as claimed in claim 1, wherein the balloon is attached to the planar member by an adhesive.

5. A combination as claimed in claim 1, wherein the coating is substantially opaque.

6. A combination as claimed in claim 5, wherein the coating is colored.

7. A combination as claimed in claim 1, wherein the balloon has a scent applied thereto.

8. A combination according to claim 1 which, prior to inflation, the balloon is in the form of a substantially rectangular shape.

9. A combination according to claim 1, wherein the foil is substantially transparent to microwave radiation.

10. A combination as claimed in claim 1 wherein the balloon is so coated on its inner surface.

11. A plurality of combinations, each according to claim 1, formed integrally in a sequential band of said combinations.

12. A plurality of combinations as claimed in claim 11, having lines of separation between adjacent combinations to facilitate separation of individual combinations from the band.

13. A plurality of combinations as claimed in claim 12, where the lines of separation comprise perforated lines separating the respective adjacent combinations within the band.

14. A plurality of combinations as claimed in claim 11 supplied as and forming a fanfold stack.

15. A plurality of combinations as claimed in claim 11 wound on a reel.

16. A combination as claimed in claim 1 wherein said one of the metallic or glossy plastic foil material is non-receptive to ink except on said ink retentive markable coating surface.

17. The combination of a balloon comprising a one of metallic or glossy plastics foil, at least part of a surface of said foil being provided with an ink retentive markable coating such that a design may be imprinted thereon, and means for supporting the balloon such that the supported balloon may be fed, prior to inflation, through an ink jet printer for printing said design thereon.

* * * * *

UNITED STATES PATENT AND TRADEMARK OFFICE
CERTIFICATE OF CORRECTION

PATENT NO. : 6,663,455 B1  
DATED : December 16, 2003  
INVENTOR(S) : Lang

It is certified that error appears in the above-identified patent and that said Letters Patent is hereby corrected as shown below:

<u>Title page,</u>
Item [76], Inventor, amend "Phillip" to read -- Philip --.

Signed and Sealed this

Thirteenth Day of April, 2004

JON W. DUDAS
*Acting Director of the United States Patent and Trademark Office*